(12) United States Patent
Kanai et al.

(10) Patent No.: US 11,668,880 B2
(45) Date of Patent: Jun. 6, 2023

(54) MOUNTING BRACKET FOR A FIBER OPTIC FAN-OUT SYSTEM

(71) Applicant: Senko Advanced Components, Inc., Marlborough, MA (US)

(72) Inventors: Shuntaro Kanai, Yokkaichi (JP); Kazuyoshi Takano, Tokyo (JP); Paul Newbury, Ashland, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/411,977

(22) Filed: Aug. 25, 2021

(65) Prior Publication Data

US 2021/0382243 A1 Dec. 9, 2021

Related U.S. Application Data

(63) Continuation of application No. 16/831,300, filed on Mar. 26, 2020, now abandoned.

(60) Provisional application No. 62/824,181, filed on Mar. 26, 2019, provisional application No. 62/970,861, filed on Feb. 6, 2020.

(51) Int. Cl.
 *G02B 6/36* (2006.01)
 *G02B 6/38* (2006.01)
 *G02B 6/44* (2006.01)

(52) U.S. Cl.
 CPC ......... *G02B 6/3825* (2013.01); *G02B 6/3885* (2013.01); *G02B 6/4471* (2013.01); *G02B 6/3888* (2021.05)

(58) Field of Classification Search
 CPC .. G02B 6/3825; G02B 6/3885; G02B 6/4471; G02B 6/4452; G02B 6/36
 See application file for complete search history.

(56) References Cited

U.S. PATENT DOCUMENTS

| 10,012,802 B2 * | 7/2018 | Newbury | G02B 6/4472 |
| 2017/0192192 A1 * | 7/2017 | Mead | G02B 6/3897 |

* cited by examiner

*Primary Examiner* — Jennifer Doan

(57) ABSTRACT

An integral fan-out connector assembly for fiber optic cables includes a connector housing that provides an integrated fan-out housing and connection adapter. The fan-out connector housing may be configured with a variety of cable adapters, and may be installed as a 'plug and play' type solution where it will be ready to accept a feed cable for use when needed. A bracket may support the fan-out system on a support structure as a pole. The bracket can facilitate plug-and-play use of the fan-out system.

15 Claims, 20 Drawing Sheets

Prior Art

Prior Art

MOUNTING BRACKET FOR A FIBER OPTIC FAN-OUT SYSTEM

CROSS-REFERENCE TO RELATED APPLICATIONS

This application is a continuation of U.S. application Ser. No. 16/831,300, filed Mar. 26, 2020, entitled Integrated Fiber Optic Fan-Out Connector, and claims priority to U.S. Provisional Patent Application Ser. Nos. 62/824,181 and 62/970,861, each of which is hereby incorporated by reference in it is entirety.

BACKGROUND

The use of fiber optics for communications purposes continues to grow. Data, voice, and other communication networks are increasingly using fiber optics to carry information. Conventional fiber optic cables include optical fibers that conduct light in the transmission of voice, video, and data information Optical cables have the advantages of large bandwidth and low power loss. Typical applications for optical cables include fiber-to-the-curb (FTTC), fiber-to-the-home (FTTH), fiber-to-the-desk (FTTD), fiber-to-the-antenna (FTTA), plenum, riser, local area networks (LANs), and closed circuit television systems (CCTV).

In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adapter to align the fibers such that the light can transmit over the connection without interruption.

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of ceramic or other suitable material. A multi-fiber optic cable is terminated in the connector, and a plurality of individual optical fibers of the cable may be terminated in the ferrule. A popular type of fiber optic cable is a multi-fiber flat, or ribbon cable. Since the individual optical fibers of the cable are very closely spaced, a fan-out connector may often be used for receiving and spreading the individual fibers of the cable so that the fibers are more easily connectorized for individual use. The individual fibers may extend away from the fan-out within a plurality of manipulatable tubes that also protect the fibers.

Fan-out blocks or modules are generally mounted within an enclosure, are wall mounted or bracket mounted, and include a direct feeder cable input that feeds into the housing and provides the individual fibers of the fan-out. The end of the feeder cable may include a fiber optic cable connector for connection to a cable feed, such as a feed in a base station at a distance from the enclosure. A fan-out kit may include terminal fiber connectors, a main feed connector, a fan-out block, and integral fiber optic cables that extend from the feed connector on the one end, to and through the fan-out block and to the individual terminal connectors on the other end. There remains a need for a simplified fan-out system that may be adaptable to a variety of uses.

SUMMARY

In one aspect, a mounting bracket for supporting a fiber optic fan-out system comprises a pigtail connector holder configured to hold a plurality of pigtail connectors of the fiber optic fan-out system at spaced apart locations along the pigtail connector holder. A fan-out housing holder is configured to hold a fan-out housing of the fiber optic fan-out system. The fan-out housing holder defines a keyhole slot that extends generally in plane. The keyhole slot has a longitudinal axis located on the plane and having a first portion and a second portion spaced apart along the longitudinal axis. The first portion has a first maximum inner dimension along a transverse axis located on the plane and oriented transverse to the longitudinal axis. The second portion has a second maximum inner dimension along the transverse axis. The first inner dimension is greater than the second inner dimension such that an enlarged portion of the fan-out housing is passable through the first portion of the keyhole slot by movement of the fan-out housing relative to the fan-out housing holder along an insertion axis transverse to the plane of the keyhole slot. The fan-out housing is slidable along the longitudinal axis from the first portion of the keyhole slot to the second portion of the keyhole slot after the enlarged portion passes through the first portion of the key hole slot along the insertion axis. The fan-out housing holder is sized and arranged to seat the enlarged portion of the fan-out housing and thereby hold the fan-out housing on the mounting bracket when the fan-out housing slides along the longitudinal axis to the second portion of the keyhole slot.

In another aspect, a plug and play mounting assembly comprises a fan-out adapter configured to accept an optical fiber at first end. The fan-out adapter has a break-out gland to plural fiber optic cables with a fiber optic connector attached thereto at a distal end of each cable. An outdoor connector secures within it the fiber optic connector. A connector mounting panel includes spaced apart connector mounting holes. The outdoor connector is secured within one of the connector mounting holes. The connector mounting panels are offset from one another to allow access to the outdoor connector.

In another aspect, a cell-tower cable management system comprises a fan-out assembly with a multi-feeder fiber optic cable secured to first end of a plug frame housing. A cable gland is at a second end with a plural of fiber optic cable extending from the cable gland. Each fiber optic cable having an optical fiber therein. The optical fiber spliced to one of the multi-feeder fiber optic cable optical fiber at a first end. An outdoor rated connector is terminated at a second end of the optical fiber forming a pigtail assembly. An outdoor rated connector has a locking ring that secures the pigtail assembly to a port formed within in bracket. The bracket is formed of a plurality of folded plate sections, the plate sections are compact to maximize space usage on a cell-tower.

Other aspects and features will be apparent hereinafter.

BRIEF DESCRIPTION OF THE FIGURES

Corresponding reference numbers indicate corresponding parts throughout the drawings.

DETAILED DESCRIPTION

Figure 1A:
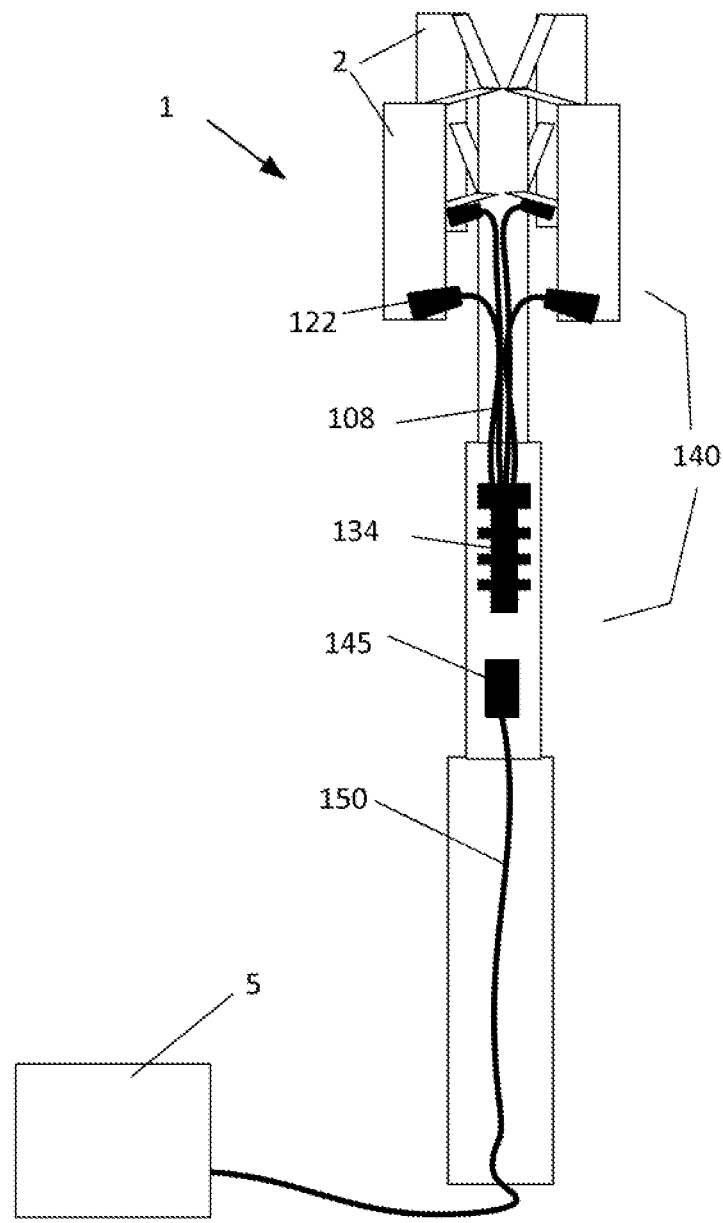
FIG. 1A depicts a prior art installation of a fan-out system.

Installations of fiber-to-the-antenna (FTTA) fiber optic systems, such as those that provide wireless phone and internet services, may be simplified by providing plug-and-play type connection assemblies that connect the remote radio units to base transceiver stations. As represented in FIG. 1A, remote radio units 2 may typically be mounted on antenna towers 1, and a base transceiver station 5 may be located near the base of the tower, or a short distance away from the tower. Alternatively, such remote radio units 2 may be mounted on the tops of tall buildings or other tall structures, such as water towers.

As represented in FIG. 1A, but exaggerated in size, a fan-out connector assembly 140 may be installed as a stand-alone distribution system in the vicinity of the remote radio units 2. The assembly 140, as discussed in more detail below, and shown in greater detail in FIG. 2A, may include a fan-out connector housing 134 having a plurality of fiber optic cables, or pigtails, 108 extending therefrom. Conventionally, the fan-out connector housing 134 may be fastened in place with a clamping device, such as, for example, a cable tie or hose clamp type securing device. The fiber optic cables 108 may be terminated by fiber optic connectors 122 that are configured to connect with the remote radio units 2. An installed fan-out connector assembly 140 may then be ready for plug-and-play use. The inventors have recognized a need in the art for mounting the fan-out connector assembly on an antenna tower in a way that facilitates connection of the base transceiver station 5 to the remote radio units 2.

A main feeder cable 150 may be provided between the base station 5 and the installed fan-out connector assembly 140. The distal end of the feeder cable 150 may be terminated with a connector 145 that plugs into the fan-out connector housing 134 to connect individual fiber optic cables in the feeder cable with the fiber optic cables 108. Individual fibers of the feeder cable 150 therefore do not need to be connectorized, providing for an easier installation of the main feeder cable.

Figure 2A:
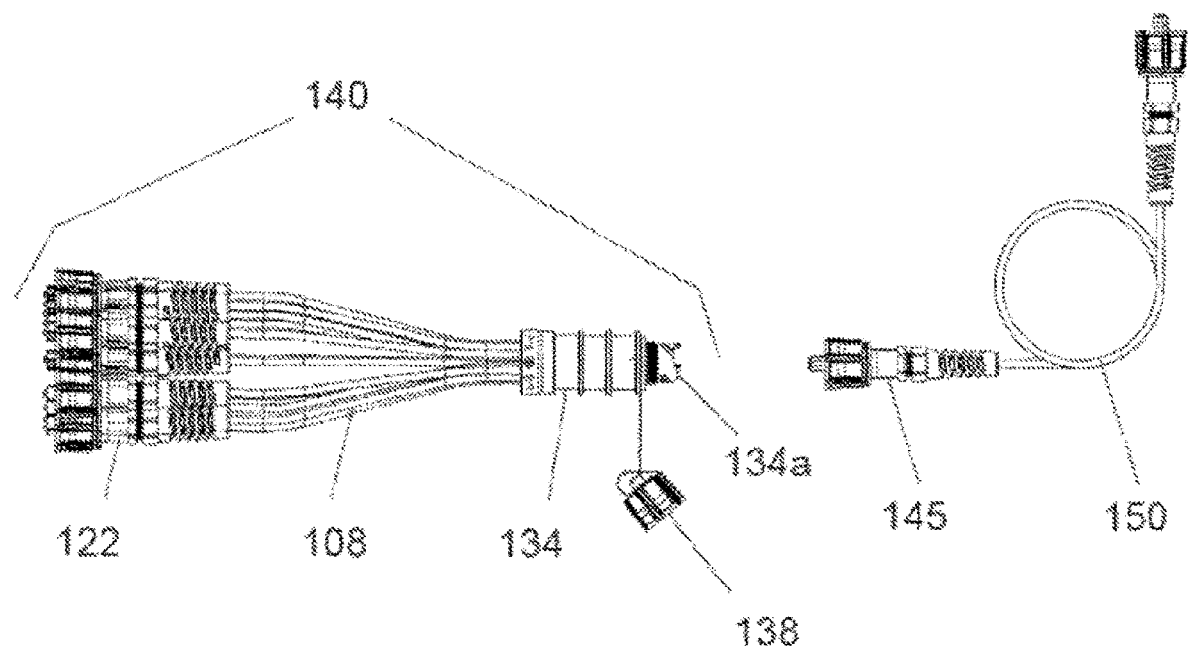
FIGS. 2A and 2B depict the prior art fan-out system.
Figure 2B:
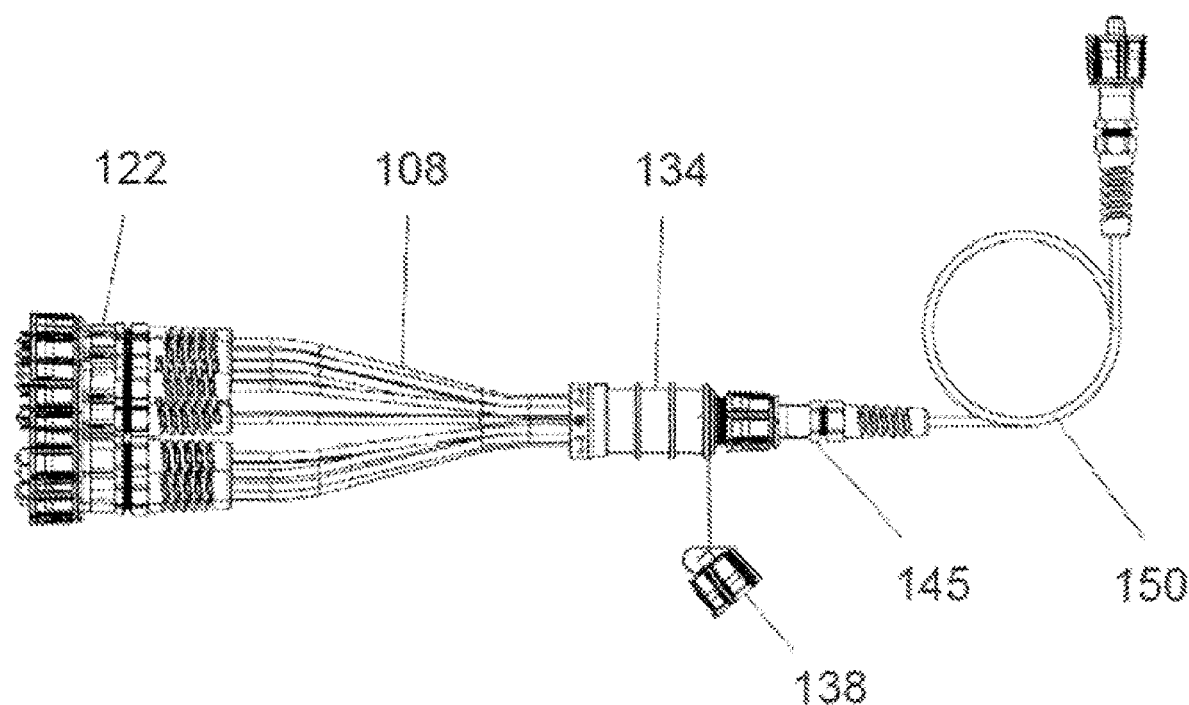

FIGS. 2A and 2B show isolated views of known fan-out connector assemblies 140. As described more fully in U.S. Pat. No. 10,012,802, which is hereby incorporated by reference in its entirety, each fan-out assembly 140 includes the fan-out connector housing 134 with attached cables 108 and connectors 122. For various end uses, such as in an FTTA system as described above, assemblies 140 may be provided with different lengths and types of cables 108, as well as different types of connectors 122. Assemblies 140 may be sold pre-assembled, or alternatively, the individual components (fan-out connector housing 134, cables 108 and connectors 122) may be provided separately for assembly by an end user.

A protective/dust cap 138 may be provided for covering and protecting the open end 134a of the fan-out connector housing 134. Various configurations and features of the fan-out connector housing 134 are discussed further below. In an embodiment as depicted in FIGS. 2A and 2B, a feed cable 150 may be configured with an appropriate connector 145 for connection of the feed cable to the fan-out connector housing 134, and thereby connection of the optical fibers within the feed cable with fiber optic cables in the cables 108. With such an embodiment, a pre-assembled fan-out assembly 140 may be installed in a housing, such as housing 10, via a knock-out in the housing wall, as depicted in FIG. 1. In an embodiment, housings may be sold with one or more pre-installed fan-out assemblies.

After installation in a housing, and when needed for use, a feed cable 150 may simply be plugged into the fan-out connector housing 134 via the end 134a. The fan-out connector housing 134 therefore provides 'plug-and-play' ease of use. In a further embodiment, as also discussed below, a feed cable 150 could be an integral component of a fan-out connector assembly wherein the fiber optic cables within the feed cable are integral with the optical fibers of cables 108 so that no connector 145 is needed.

Figure 3A:
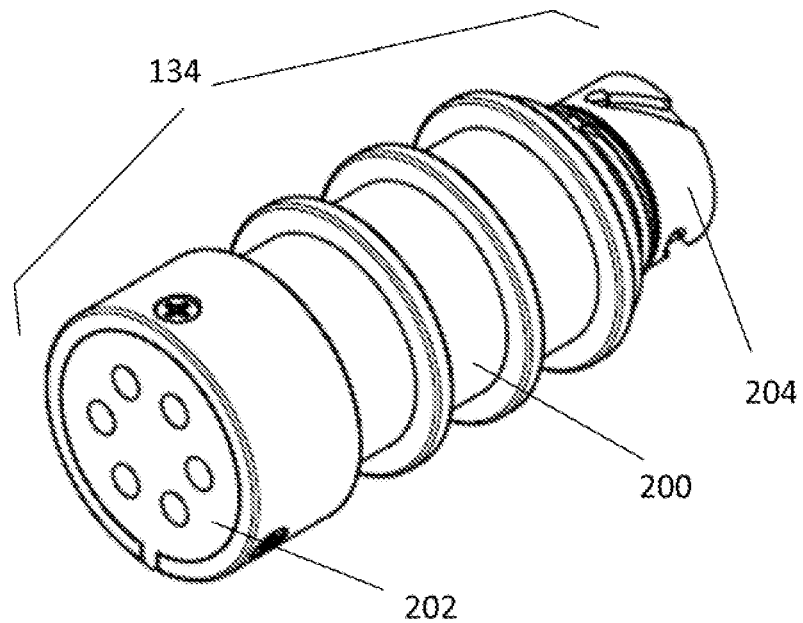
FIGS. 3A and 3B show a prior art fan-out housing.
Figure 3B:
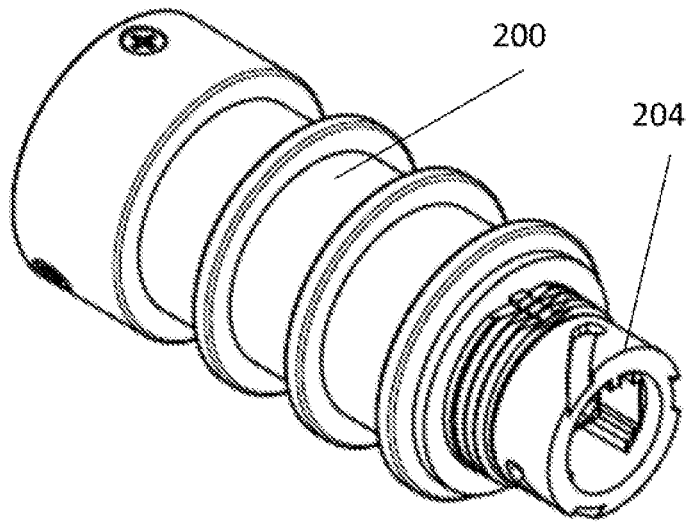
Figure 4A:
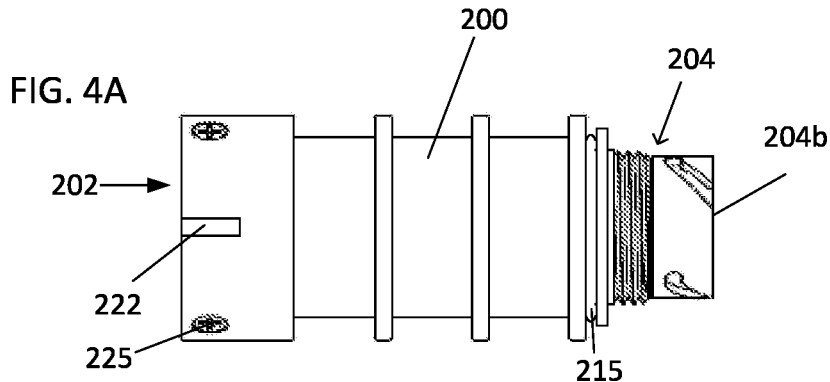
FIG. 4A is a bottom view of the fan-out housing.
Figure 4B:
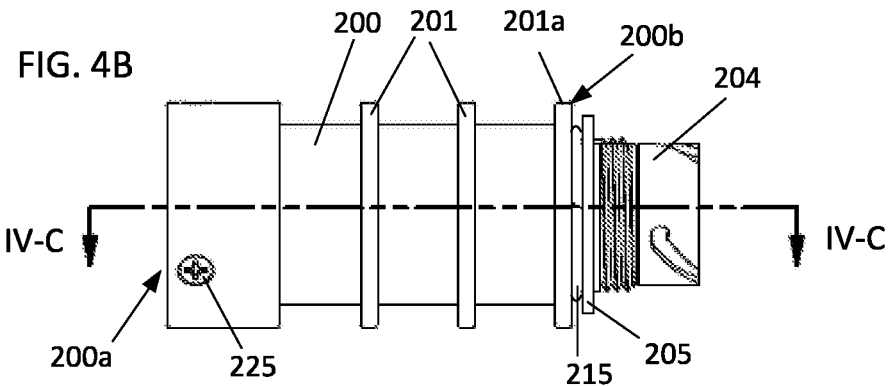
FIG. 4B is a side view of the view of the fan-out housing.
Figure 4C:
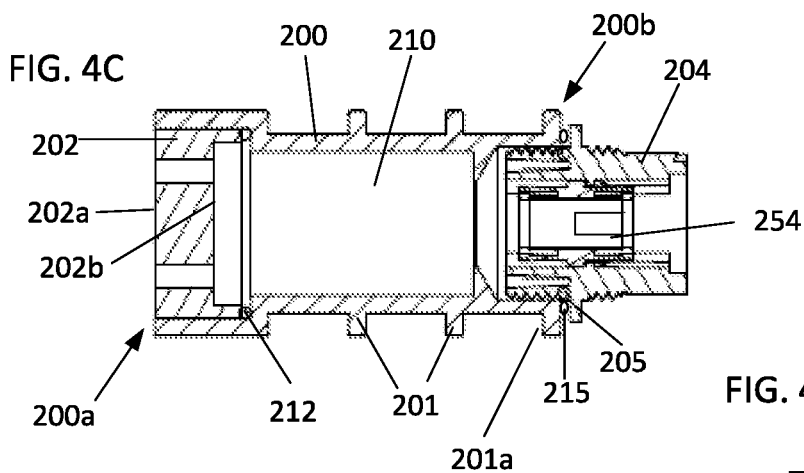
FIG. 4C is a section taken in the plane including line IV-C—IV-C of FIG. 4B.
Figure 4D:
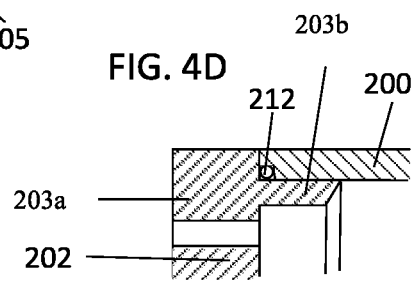
FIG. 4D is an enlarged fragmentary section of a fan-out housing having an alternative construction.
Figure 5:
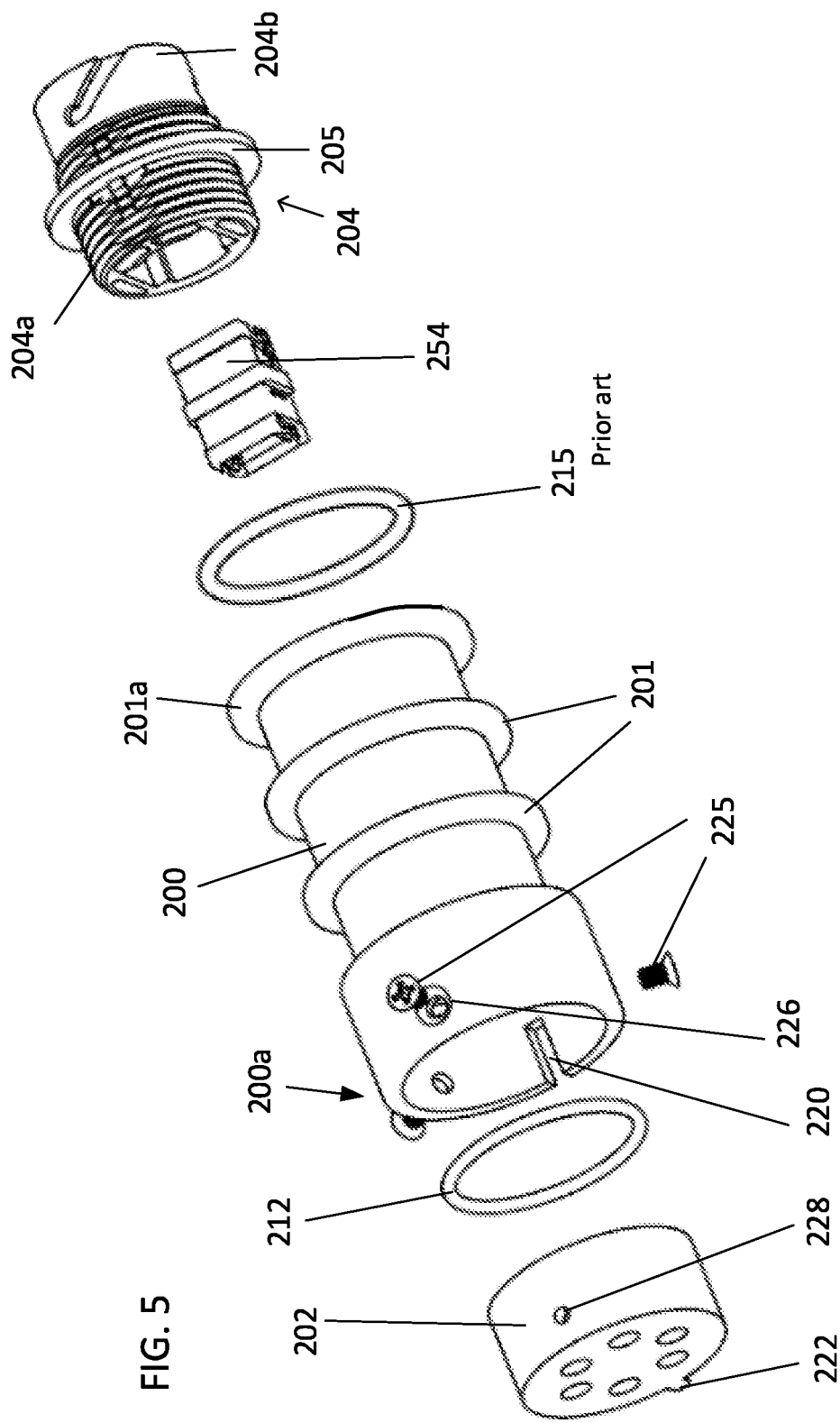
FIG. 5 provides an exploded view of the prior art fan-out housing.

The fan-out connector housing 134, may include a housing that, as shown in greater detail in FIGS. 3-5, for example, may include a main housing body 200, a fan-out member 202, and an optical fiber receptacle 204. In an embodiment, a fan-out housing for fanning out optical fibers of a multi-fiber source may include a main body 200 defining an interior cavity 210 therein and having a first body portion and a second body portion spaced from the first body portion. The fan-out housing may also include a fan-out member 202, discussed further below, releasably attachable with the first body portion for fanning out optical fibers 108, and a cable receptacle 204 releasably attachable with the second body portion. As discussed in more detail below, the cable receptacle 204 may be either of an optical fiber adapter configured for attachably receiving a connector of a multi-fiber optical cable, or an optical fiber cable gland configured for passage of a multi-fiber optical cable therethrough.

In an embodiment as shown in FIGS. 3-5, for example, the fan-out member may be a drum, and the receptacle may be an adapter. In an embodiment, housing body 200 may be essentially cylindrical and define a central longitudinal cavity 210. The housing body 200 may be formed of any rigid material such as metal or polymers, and may be molded or machined. In an embodiment, the housing body 200 may be machined aluminum, or may be injection molded and may be formed of a polymer, such as polybutylene terephthalate, polycarbonate, polystyrene, or polyethylene, to provide a few non-limiting examples.

In an embodiment, a housing body 200 may include one or more ribs 201 that may be disposed about the exterior of the housing. The ribs 201 may provide a gripping feature that provide for a better grasp of the housing, for example, during installation or assembly. An end rib 201a may provide a seat against which the adapter 204 abuts as an insertion stop. An O-ring 215 may be provided between a flange 205 of the adapter 204 and the end rib 201a to provide a seal for keeping moisture out of the interior 210. The O-ring 215 may be silicone, or any other type of elastomeric polymer, such as butyl rubber, polyisoprene rubber, butadiene rubber, or nitrile rubber, to provide a few non-limiting examples. As an alternative to the O-ring 215, a flat elastomeric washer (not shown) may be provided between the flange 205 of the adapter 204 and the end rib 201a.

The fan-out member 202 may be disc-shaped, and may be configured as a cable guide drum. A first end 200a of the housing may be configured for receiving the cable guide drum 202 therein. In an embodiment as shown, the drum 202 may be configured to fit within the end 200a so that an exterior surface 202a is flush with the end 200a. In an alternative embodiment, as depicted in FIG. 4D, a portion 203a of the drum 202 may be configured to be disposed within the end 200a and a portion 203b may be configured to protrude axially from the end. The protruding portion 203b may have a larger diameter than the insertion portion 203a to provide an insertion stop, and the diameter of the protruding portion may match the diameter of the housing end. As shown in FIGS. 4C and 4D, an O-ring 212 may be disposed between the housing body 200 and the drum 202 to provide a seal for keeping moisture from entering into the cavity 210. The O-ring 212 may be may be silicone, or any other type of elastomeric polymer, such as butyl rubber, polyisoprene rubber, butadiene rubber, or nitrile rubber, to provide a few non-limiting examples.

The end 200a of the housing body 200 may include a key slot 220 and the drum 202 may include a key 222 configured to fit within the key slot and prevent rotation of the drum within the housing. Alternatively, the drum 202, may include a slot and the housing body 200 may include a key member that it's the slot. In an embodiment, the drum 202 may be retained within the end 200a by screws 225. In one embodiment, the housing end 200a may include holes 226 for receiving the screws 225 therethrough, and the drum 202 may include threaded holes 228 for receiving the screws. Holes 226 and 228 may be properly aligned for the screws by means of the keying features 220, 222. In an alternative embodiment, holes 226 may be threaded, and the screws 225 may, if desired, be at least partially threaded into the housing body 200 prior to placement of the drum 202 into the housing. Upon insertion of the drum 202 fully into the housing body 200 the screws 225 may be tightened into place to retain the drum in the housing. If the holes 226 are threaded, the drum may or may not include the holes 228, wherein a tightening of the screws into the housing end may engage the ends of the screws with the drum 202 to frictionally retain the drum within the housing. Alternatively, to avoid alignment issues, and possibly eliminate the need for keying features, the drum may include an annular groove disposed about the drum and the screws, by means of threaded holes, may be tightened into the annular groove in any relative position of the drum within the housing body.

The screws 225 may frictionally engage the drum within the groove 229 to prevent rotation of the drum within the housing.

If a permanent attachment of the drum 202 to the housing body 200 is desired, an adhesive may be used to retain the drum in the housing, and any keying alignment features and assembly holes may not be needed. In addition, other types of coupling may also be used, such as a snap together coupling wherein a projecting portion of at least one of the housing body 200 and drum 202 may be configured to snap into and be retained within a groove or slot in the other of the housing or drum. One additional type of coupling may include biased tabs which project radially inwardly from the end 200a and are configured to engage and retain the drum within the housing, wherein the tabs are movable radially outwardly to allow for passage of the drum into the housing end, and then return to an original configuration to retain the drum within the housing. Such tabs may be configured to be opened manually, or with a tool to allow for removal of the drum.

In the illustrated embodiment, the end 200a forms an enlarged head of the housing 134. The remainder of the housing body 200 forms a shaft having cross-sectional dimensions that are less than the corresponding cross-sectional dimensions of the head 200a. Thus, the head 200a defines a shoulder with the shaft of the housing body 200. As will be explained in further detail below, the enlarged head of the housing body 200 can be utilized to secure the fan-out housing 134 onto a mounting bracket to support the housing on a support structure such as a pole.

As represented in FIGS. 4C and 5, a second end 200b of the housing body 200 may be configured for receiving an adapter 204. Various configurations/sizes of adapters 204 may be provided for installation at the second end 200b of the housing body 200. In an embodiment as shown, the second end 200b may be internally threaded for threaded receipt of an adapter 204 or cable gland (not shown) therein. The adapter 204 may have an externally threaded end 204a that is correspondingly threaded for being rotatably threaded into the housing body 200. Alternatively, other types of engagement couplings may be used for retaining an adapter 204 or gland on the housing body 200, such as those described above for retaining the drum within the end 200a.

An adapter 204 may include a radially extending flange 205, respectively, that may act as a stop for limiting insertion of the adapter or gland into the housing, while also providing a seat for engaging with the O-ring 215 and compressing the O-ring against the rib 201a of the housing body 200. In a further embodiment, instead of sealing with an O-ring, such as O-ring 215, a joint thread compound or Teflon tape may be provided on the threads to provide a weather-tight seal between the adapter 204 and the housing body 200.

An adapter body 204 may be configured to receive different types of cable mating adapters 254 therein. The mating adapters may have a plug-in socket at each end thereof configured for any type of multi-fiber connectors to mate the terminal ends of the connectors. As an example, adapters 254 may be configured to mate incoming connectors of types MPO (or similar), with another connector of type MPO (or similar). In a variant embodiment, the adapter may be one-piece adapters, and may include an integral internal cable mating configuration of any of the types as described above. For an integral adapter 304, instead of inserting a mating connector 254 within the adapter 204, the user would only need to select and install an appropriately configured adapter.

While the housing body 200 represented in FIG. 5 has a circular cross-section, in various other embodiments (not shown), a housing may have a cross-section that may be rectangular, triangular, hexagonal, or various other configurations.

Figure 6:
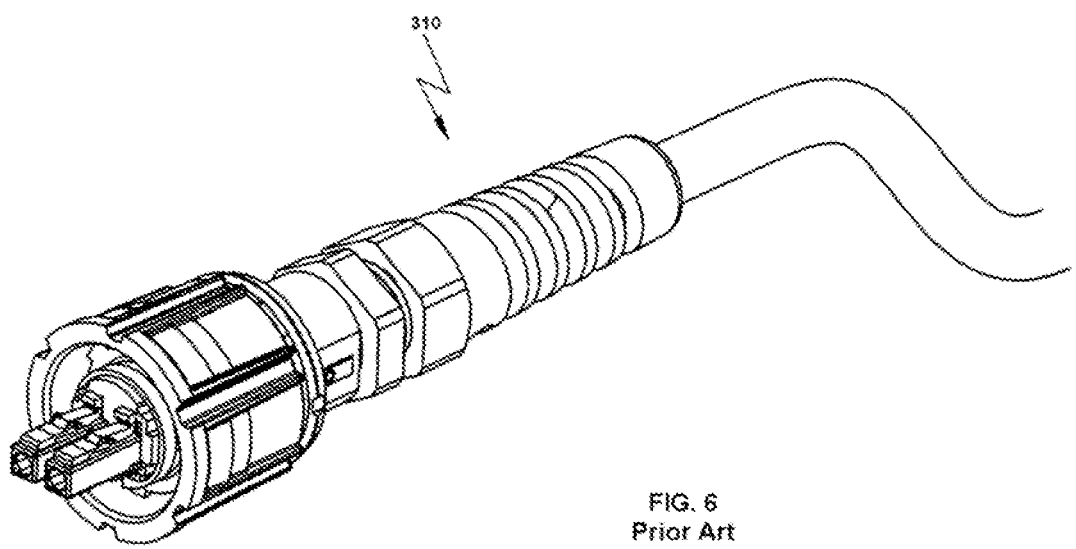
FIG. 6 is a perspective of a prior art outdoor-rated connector.
Figure 7:
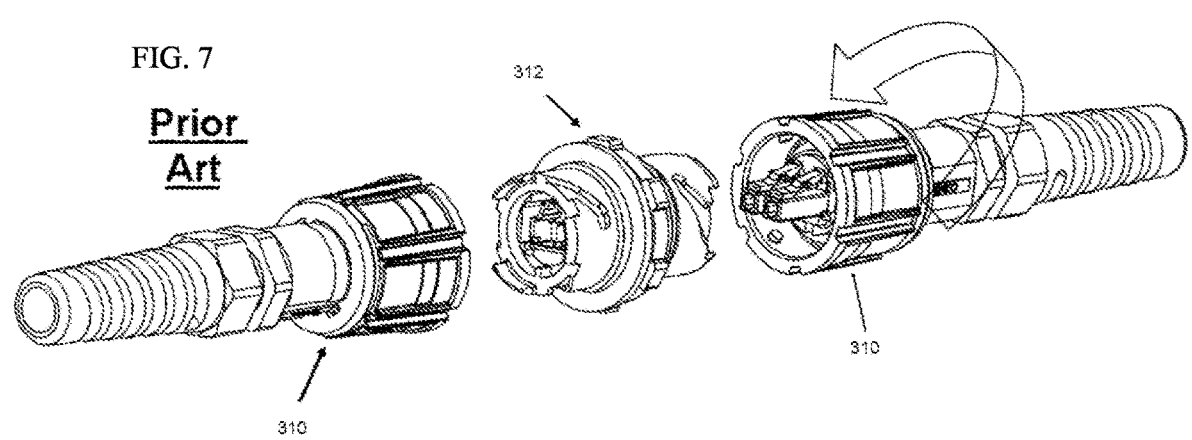
FIG. 7 is a perspective of two outdoor-rated connectors of FIG. 6 disposed adjacent to an adapter for making an optical connection between the two outdoor-rated optical connectors.
Figure 8:
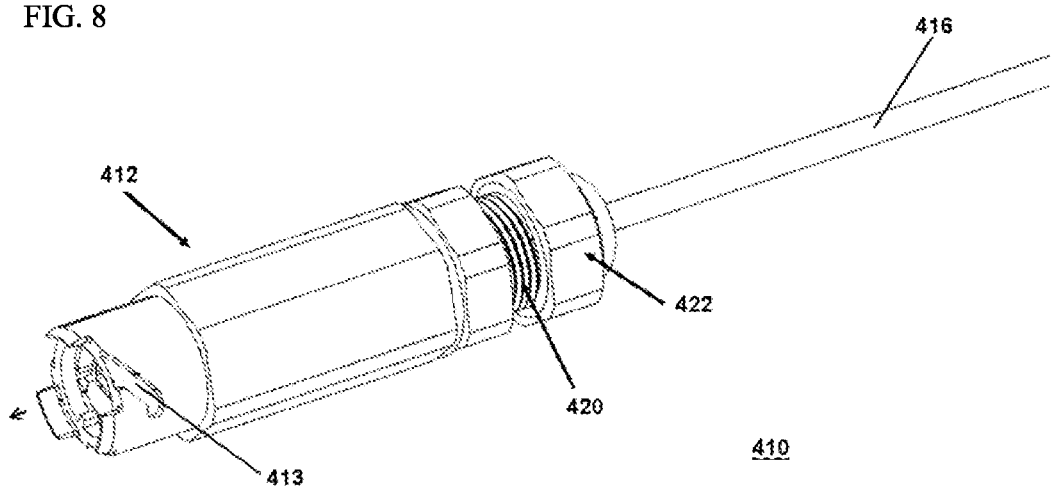
FIG. 8 is a perspective of an in-line outdoor-rated connector.

In an exemplary embodiment, each of the pigtail connectors 122 comprises an outdoor-rated connector, also referred to as a waterproof connector, ruggedized connector, hardened connector, or weather-resistant connector. Various suitable outdoor-rated connectors are known or may become known to those skilled in the art. FIG. 6 depicts an exemplary embodiment of a prior art outdoor connector 310 that may be used for the pigtails 122 of the fan-out system 140. The connector 310 is described more fully in U.S. Pat. No. 9,755,382, which is hereby incorporated by reference in its entirety. As shown in FIG. 7, two connectors 310 are configured to mate with a bayonet adapter 312 to make an optical connection.

Figure 9:
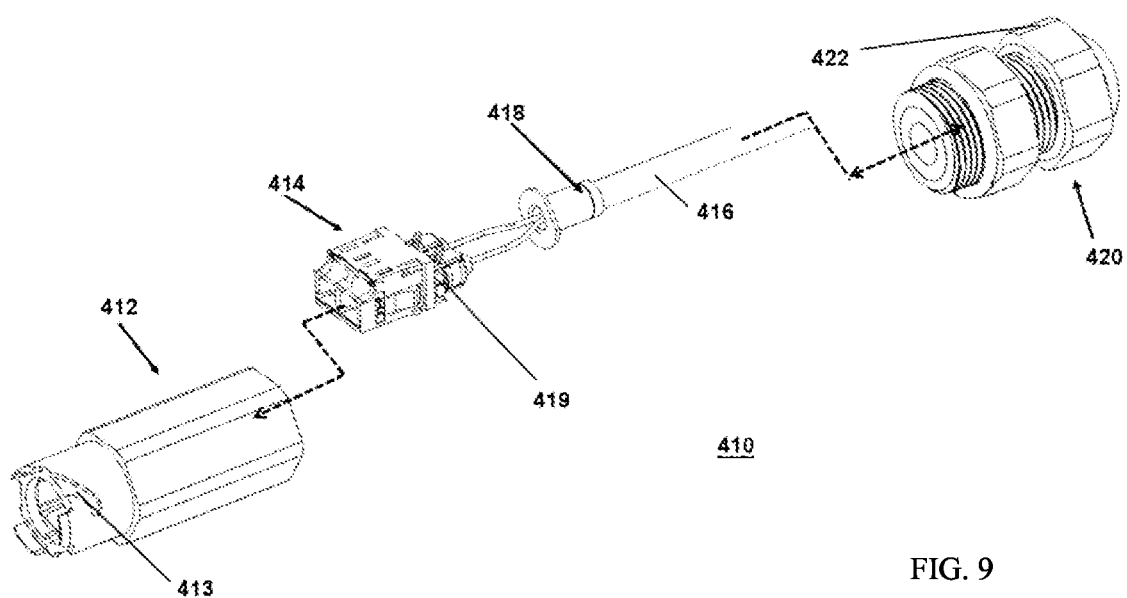
FIG. 9 is an exploded perspective of the in-line outdoor-rated connector.
Figure 10:
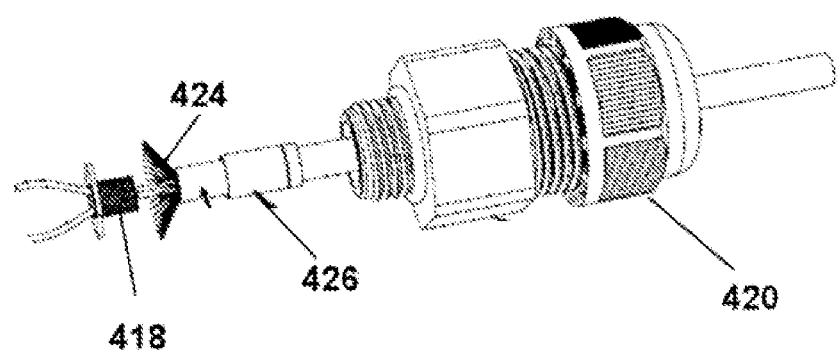
FIG. 10 is a perspective of a rear subassembly of the in-line outdoor-rated connector.
Figure 11:
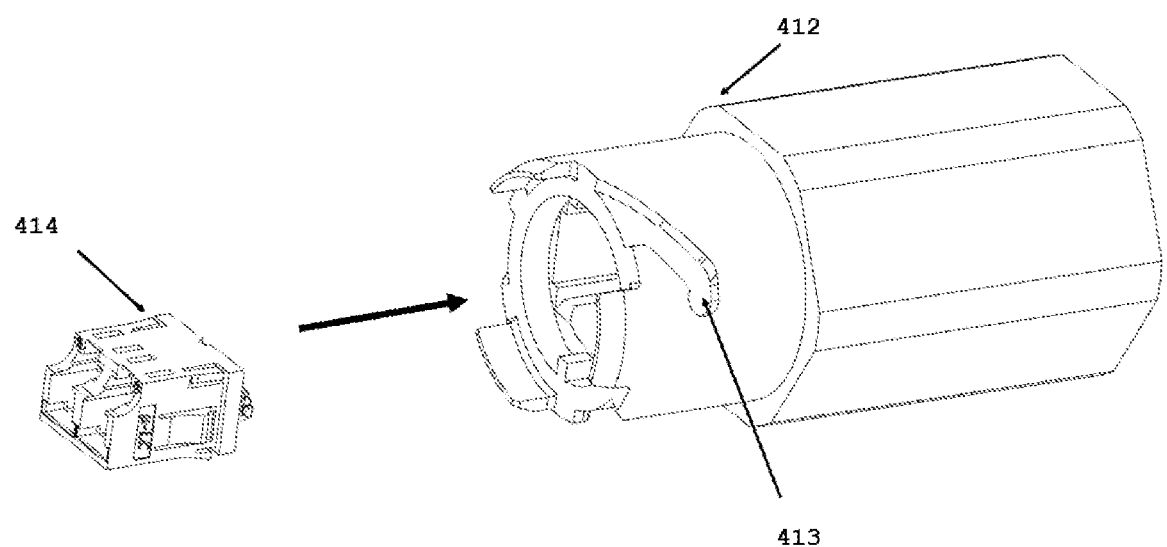
FIG. 11 is an exploded perspective of a front sub-assembly of the in-line outdoor-rated connector.
Figure 12:
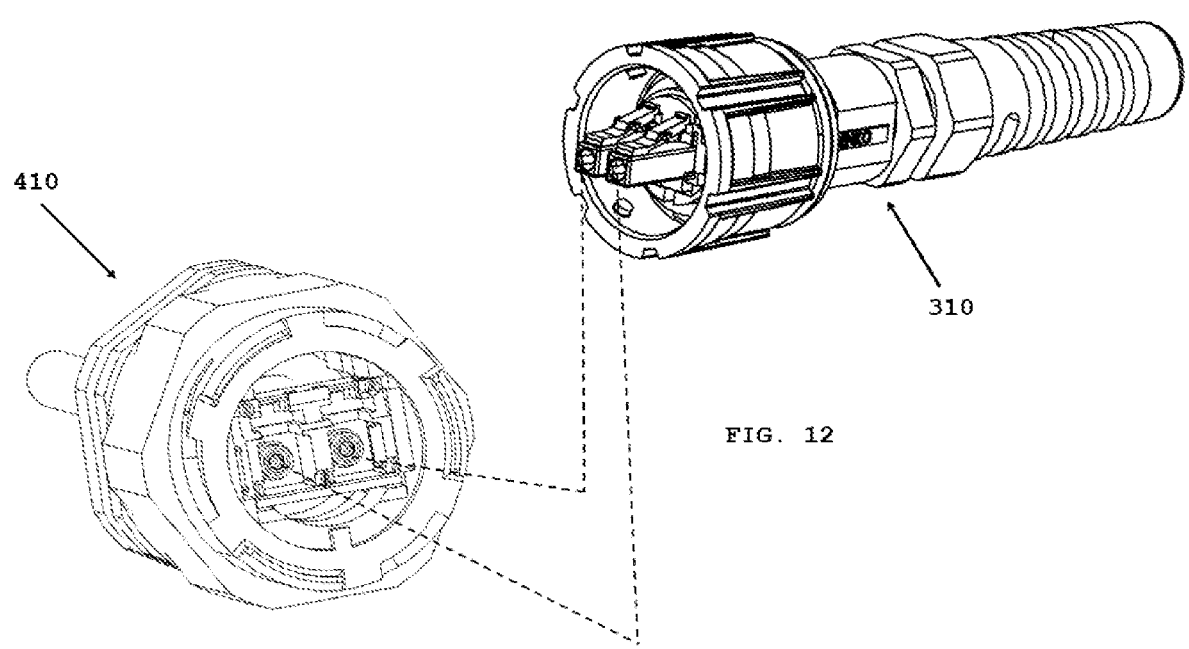
FIG. 12 is a perspective of the illustrating how the connector of FIG. 6 can connect to the connector of FIG. 8.

Referring to FIGS. 8-12, another embodiment of an outdoor connector that may be used for the pigtails of a fan-out system is generally indicated at reference number 410. The connector 410 is described more fully in U.S. Patent Application Publication No. 2020/0012050, which is hereby incorporated by reference in its entirety. Generally, each connector 410 is an in-line connector configured to mate directly with a mating connector 310, without a separate adapter 312. The connector 410 has an outer housing 412. The outer housing 412 has a front end portion and a rear end portion. The front end portion of the outer housing 412 defines an external bayonet slot 413 that is configured to rotatably receive an internal bayonet protrusion of a conventional ruggedized connector 310, shown in FIGS. 6 and 7 (see FIG. 12). That is, the configuration of the front end of the outer housing 412 corresponds with the configuration of the opposite ends of the adapter 312. The front end portion of the outer housing 412 receives the internal adapter 414. Latching structure inside the outer housing 412 locks the internal adapter 414 in place within the outer housing. In the illustrated embodiment, the internal adapter 414 comprises a duplex LC adapter with two LC ports configured to receive duplex LC plugs of the conventional ruggedized connector 310. The internal adapter 414 connects the LC plugs to the fibers of attached optical cable 416 (e.g., a pigtail cable). To connect the internal adapter 414 to the cable 416, the end of the cable jacket is stripped away, fibers of the cable are inserted through a back post 418 and connected to the rear end of the adapter (e.g., via behind-the-wall connectors 419 as shown in FIG. 9), and reinforcing fibers 424 of the cable are crimped onto the back post via crimp ring 426 (as shown in FIG. 10). Although the internal adapter 414 is configured for mating with a duplex LC connector 310 in the illustrated embodiment, other embodiments can include internal adapters for other connector standards (e.g., MT, MPO, ST). The rear end portion of the outer housing 412 is internally threaded for coupling directly to a cable gland assembly 420. Prior to connecting the cable gland assembly 420 to the outer housing 412, the cable gland is slidably received on the cable 416. After the internal adapter 414 is connected to the cable 416 and secured within the outer housing 412 as explained above, the cable gland assembly 420 is slid forward along the cable and threadably coupled to the rear end portion of the outer housing. Subsequently, a gland activation nut 422 of the cable gland assembly can be tightened onto a threaded shaft of the cable gland assembly to seal an internal cable gland (not shown) onto the cable.

Referring now to FIGS. 13-19, aspects of the present disclosure pertain to mounting brackets 810, 910, 1010 for mounting fan-out systems like the system 140 on a support structure such as a pole P so that the fan-out housing 134 and the separate pigtail connectors 122 are supported at spaced apart locations relative to one another for making the required optical connections in plug-and-play fashion. In FIGS. 13, 14, and 16-19, the brackets 810, 910, 1010 are shown supporting pigtail connectors 122, but it will be understood that the brackets may be used with fan-out systems that have any of the outdoor-rated connectors 310, 410, 510, 610 and 710, or any other suitable type of optical connector, on the pigtail cables. Broadly speaking, mounting brackets in the scope of certain embodiments of this disclosure include a fan-out housing holder configured to hold the fan-out housing, a pigtail connector holder configured to hold the pigtail connectors at spaced apart locations, and a fastening system such as one or more clamps for securing the mounting bracket onto a pole P.

Figure 13:
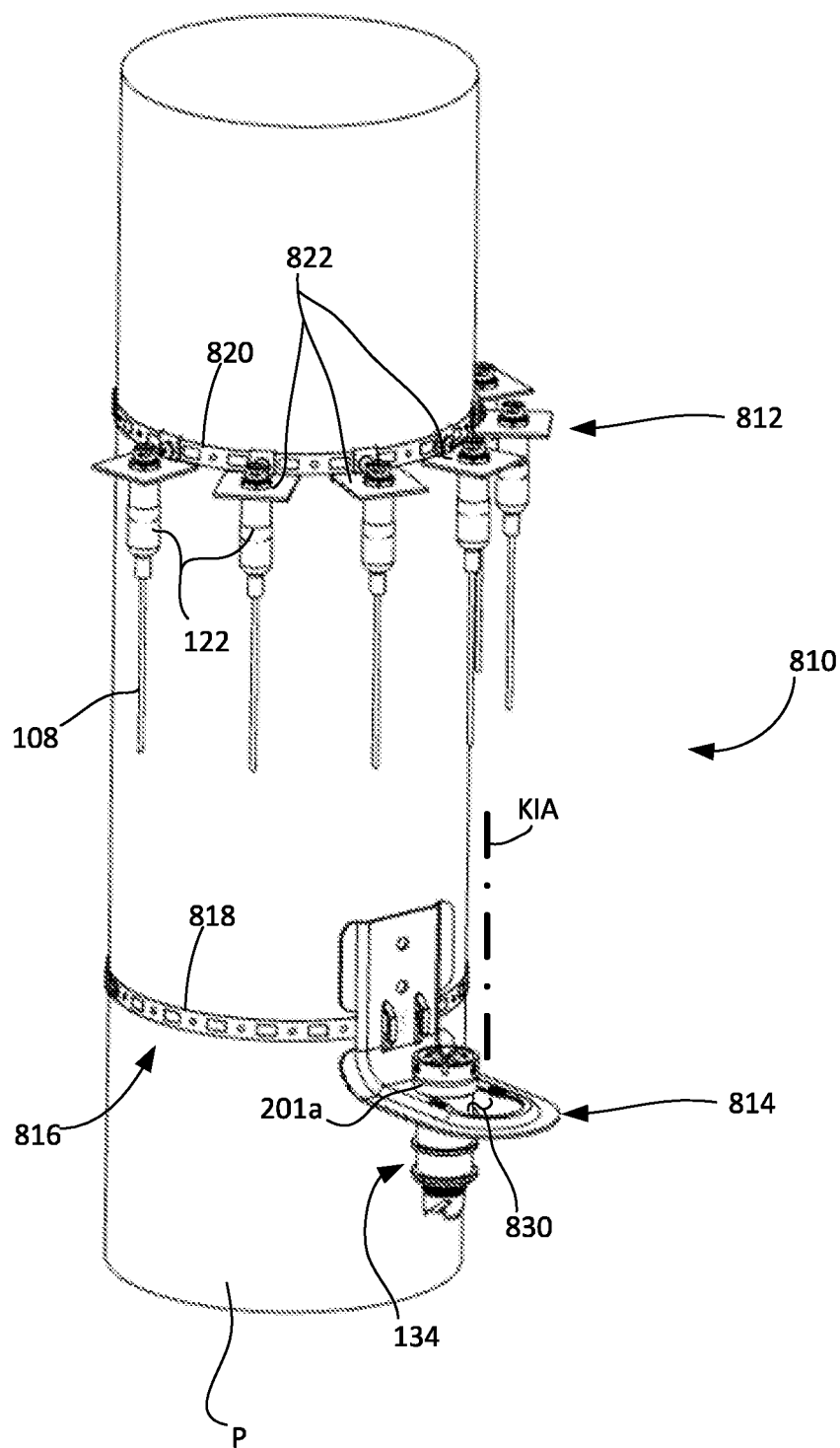
FIG. 13 is a perspective of a fan-out system mounting bracket supported on a pole.
Figure 14:
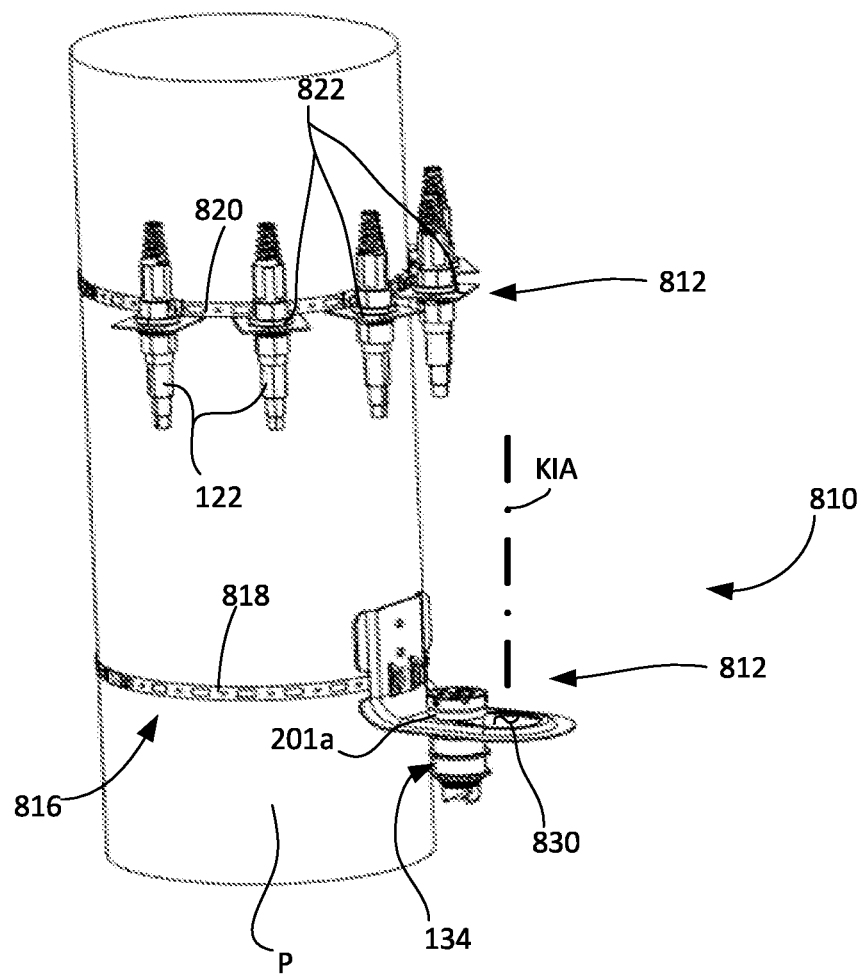
FIG. 14 is a perspective similar to FIG. 13, but which shows pigtail connectors of the fan-out system optically connected to connectors of destination cables.

Referring to FIGS. 13 and 14, one exemplary embodiment of a mounting bracket within the scope of this disclosure is generally indicated at 810. The mounting bracket 810 comprises a pigtail connector holder, generally indicated at 812, configured to hold a plurality of pigtail connectors coupled to the pigtail cables 108 of the fiber optic fan-out system 140 at spaced apart locations. The mounting bracket 810 further comprises a fan-out housing holder, generally indicated at 814 configured to hold a fan-out housing 134 of the fiber optic fan-out system 140. A fastening system, generally indicated at 816, is configured to affix the mounting bracket 810 onto a pole P. The pigtail cables 108 are shown in FIG. 13, but are removed for clarity in FIGS. 14, 16 and 18. Moreover, the pigtail cables 108 are partially broken away in FIG. 13. Their connection to the fan-out housing 134 is not illustrated in FIG. 13.

The fastening system 816 comprises a lower clamp 818 (broadly, a first clamp) and an upper clamp 820 (broadly, a second clamp). The fan-out housing holder 814 is supported on the lower clamp 818, and the pigtail connector holder 812 is supported on the upper clamp 820. In the illustrated embodiment, the upper and lower clamps 818, 820 are separate and independent such that each clamp supports one of the holders 812, 814 but not the other. In an exemplary embodiment, each clamp 818, 820 comprises a strap that is configured to extend and fasten around the pole to support the respective holder 812, 814 on the pole. Other embodiments can utilize other types of clamps without departing from the scope of the disclosure.

In one or more embodiments, the pigtail connector holder 812 comprises a plurality of mounting plates 822 at spaced apart locations along the strap of the upper clamp 820. Suitably, each mounting plate 822 comprises a thin sheet of metal or other rigid or semi-rigid material. Each mounting plate 822 has an inboard end portion affixed to the strap of the upper clamp 820, an opposite outboard end portion, and a pair of opposite side margins that extend from the inboard end portion to the opposite outboard end portion. In one or more embodiments, the clamp 820 is configured to hold each of the mounting plates 822 on a generally vertically extending pole P such that each mounting plate extends generally horizontally. The side margins of adjacent mounting plates 822 are spaced apart along the length of the strap of the upper clamp 820. In one embodiment, the mounting plates 812 are spaced apart from each other a distance sufficient to permit a workman's fingers to extend easily into a space between adjacent mounting plates. For manipulating the pigtail connectors 122 or another connector attached to the pigtail connectors. Each mounting plate 822 comprises a single hole extending through the thickness of the plate.

Each hole in the mounting plate 822 can be configured to receive one of (i) one of the pigtail connectors 122 as shown, (ii) an adapter for mating with one of the pigtail connectors, and (iii) an in-line connector for mating with one of the pigtail connectors. When one of the optical connection elements (i)-(iii) is received in the hole and an optical connection to a pigtail cable 108 is made via said optical connection element (i)-(iii), the mounting plate 822 is configured to support the respective pigtail connector 122 on the mounting plate at a spaced apart location from pigtail connectors supported on the other mounting plates. A lock ring (not shown) may be used to secure the pigtail connectors, adapter or in-line connector in the hole.

Figure 15:
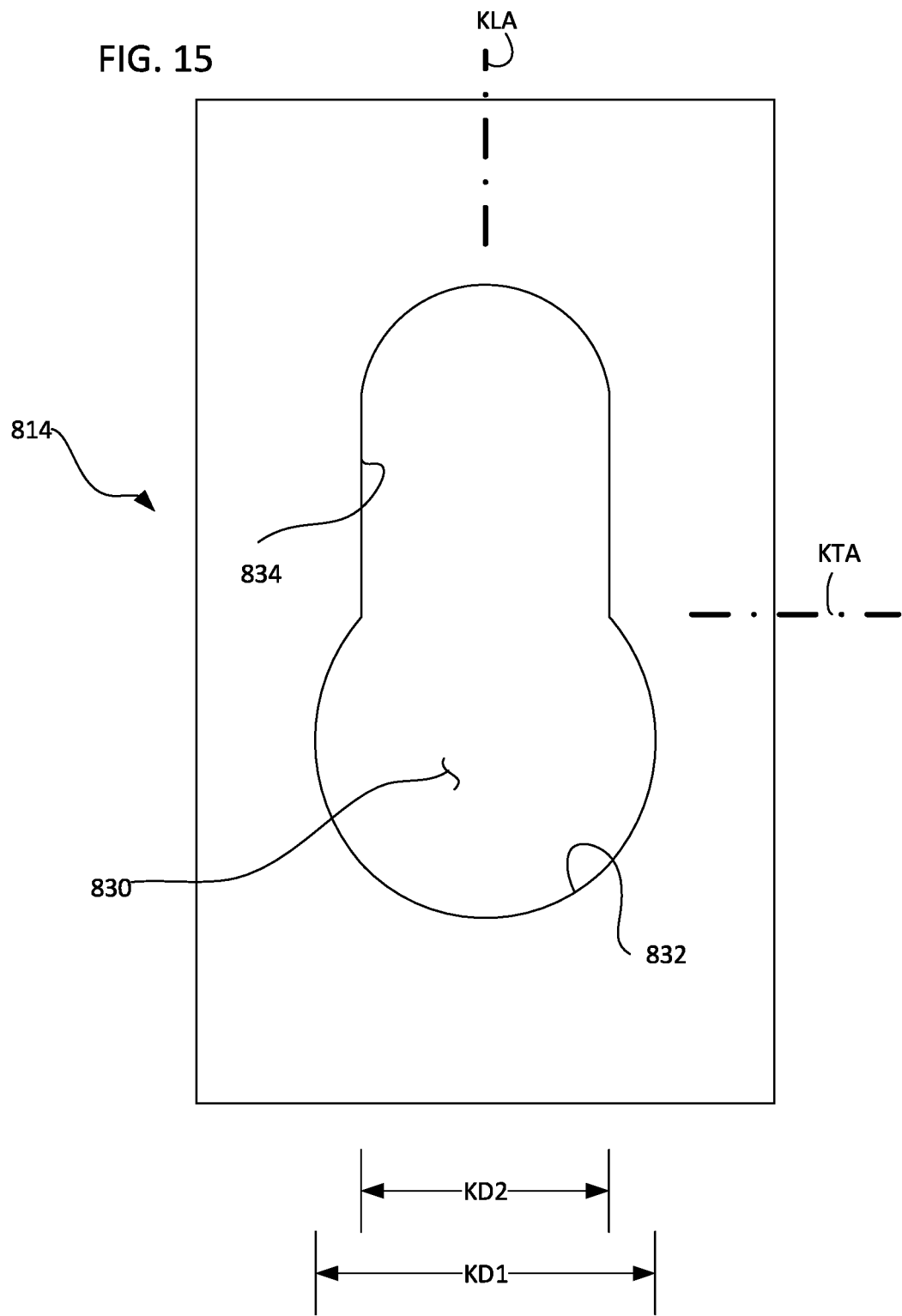
FIG. 15 is an elevation of a portion of a fan-out housing holder of the mounting bracket of FIG. 13.

Referring to FIGS. 13-15, the fan-out housing holder 814 is configured to hold the fan-out housing 134 on the pole P. In the illustrated embodiment, the fan-out housing holder 814 comprises a bracket member that defines a keyhole slot 830 that extends generally in a plane. As shown in FIG. 15, keyhole slot 830 has a longitudinal axis KLA located on the plane. The keyhole slot 830 includes a first portion 832 and a second portion 834 spaced apart along the longitudinal axis KLA. The first portion 832 has a first maximum inner dimension KD1 along a transverse axis KTA located on the plane and oriented transverse (e.g., perpendicular) to the longitudinal axis KLA. The second portion 834 has a second maximum inner dimension KD2 along the transverse axis KTA. The first inner dimension KD1 is greater than the second inner dimension KD1.

In an exemplary embodiment, the keyhole slot 830 is configured so that the enlarged head 200a of the fan-out housing 134 (broadly, an enlarged portion of a fan-out housing) is passable through the first portion 832 of the keyhole slot by movement of the fan-out housing relative to the fan-out housing holder along an insertion axis KIA (FIGS. 13 and 14) transverse to the plane of the keyhole slot. The fan-out housing 134 is slidable along the longitudinal axis KLA from the first portion 832 to the second portion 834 after the enlarged head 200a passes through the first portion of the key hole slot along the insertion axis KIA. That is, the smaller shaft portion of the housing 134 can slide from the first portion 832 to the second portion 834 once received in the slot 830. When the smaller shaft portion of the housing 134 is received in the second portion 834 of the keyhole slot 830, the enlarged head 200a can be seated on the fan-out housing holder 814 and the fan-out housing holder can hold the fan-out housing on the mounting bracket 810 as shown in FIGS. 13 and 14. Thus, the fan-out housing holder 814 is sized and arranged to engage the enlarged head 200a of the fan-out housing 134 and thereby hold the fan-out housing on the mounting bracket when the fan-out housing slides along the longitudinal axis to the second portion 834 of the keyhole slot 830. Other enlarged portions of the fan-out housing may be used to form a connection with the fan-out housing holder in the same manner as described above with respect to the head 200a. For example, it is contemplated that the ribs or flanges of the fan-out housing can be used in this manner.

Accordingly, the illustrated mounting bracket 810 is configured to support the fan-out housing 134 on the fan-out housing holder 814 and to hold the pigtail connectors 122 on the pigtail connector holder 812 at a plurality of spaced apart locations. As shown, the mounting bracket 810 holds the fan-out housing 134 such that the axis of the fan-out housing is generally parallel to the axis of the pole P. In addition, each of the mounting plates 822 is configured to hold a respective pigtail connector 122 so that the axis of the connector is generally parallel to the axis of the pole P.

Pigtail cables 108 extend vertically from the fan-out housing 134 to the respective connectors 122 along the length of the pole P.

Figure 16:
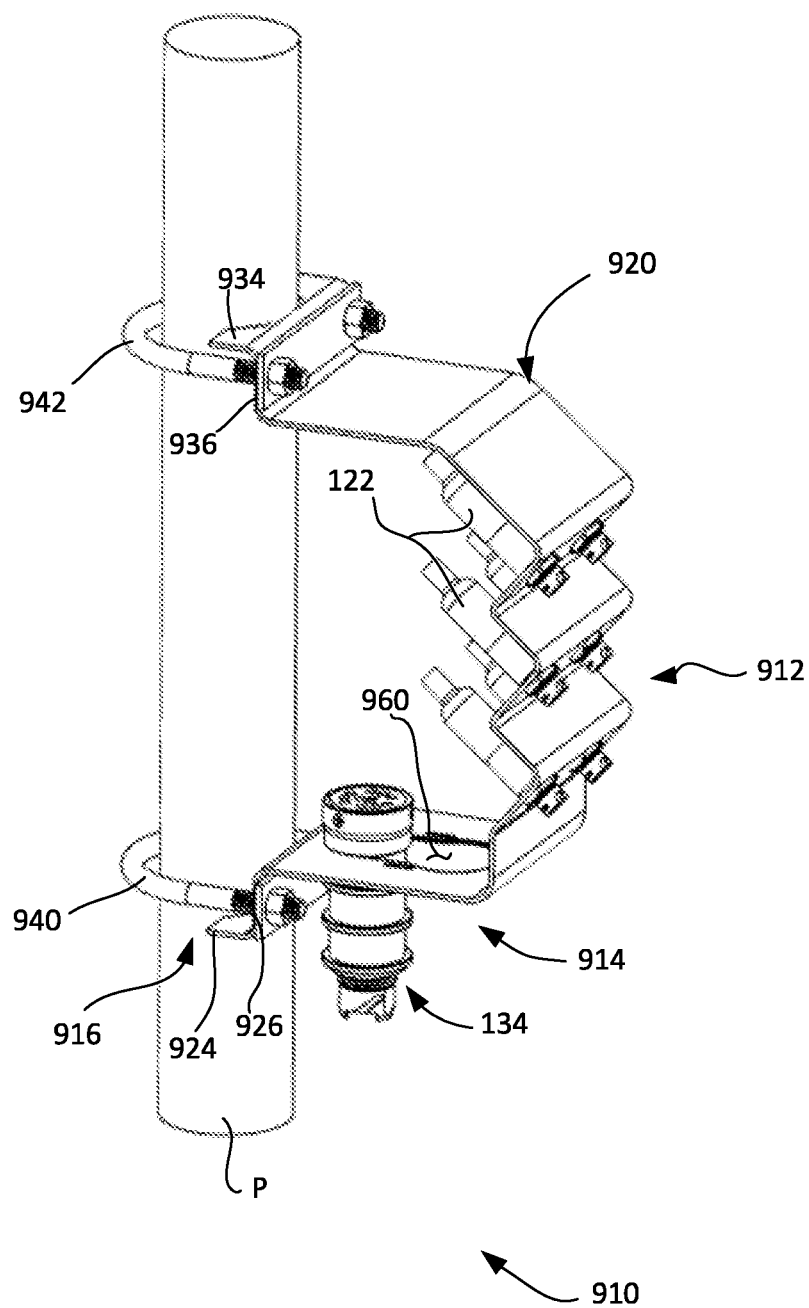
FIG. 16 is a perspective of another fan-out system mounting bracket supported on a pole.
Figure 17:
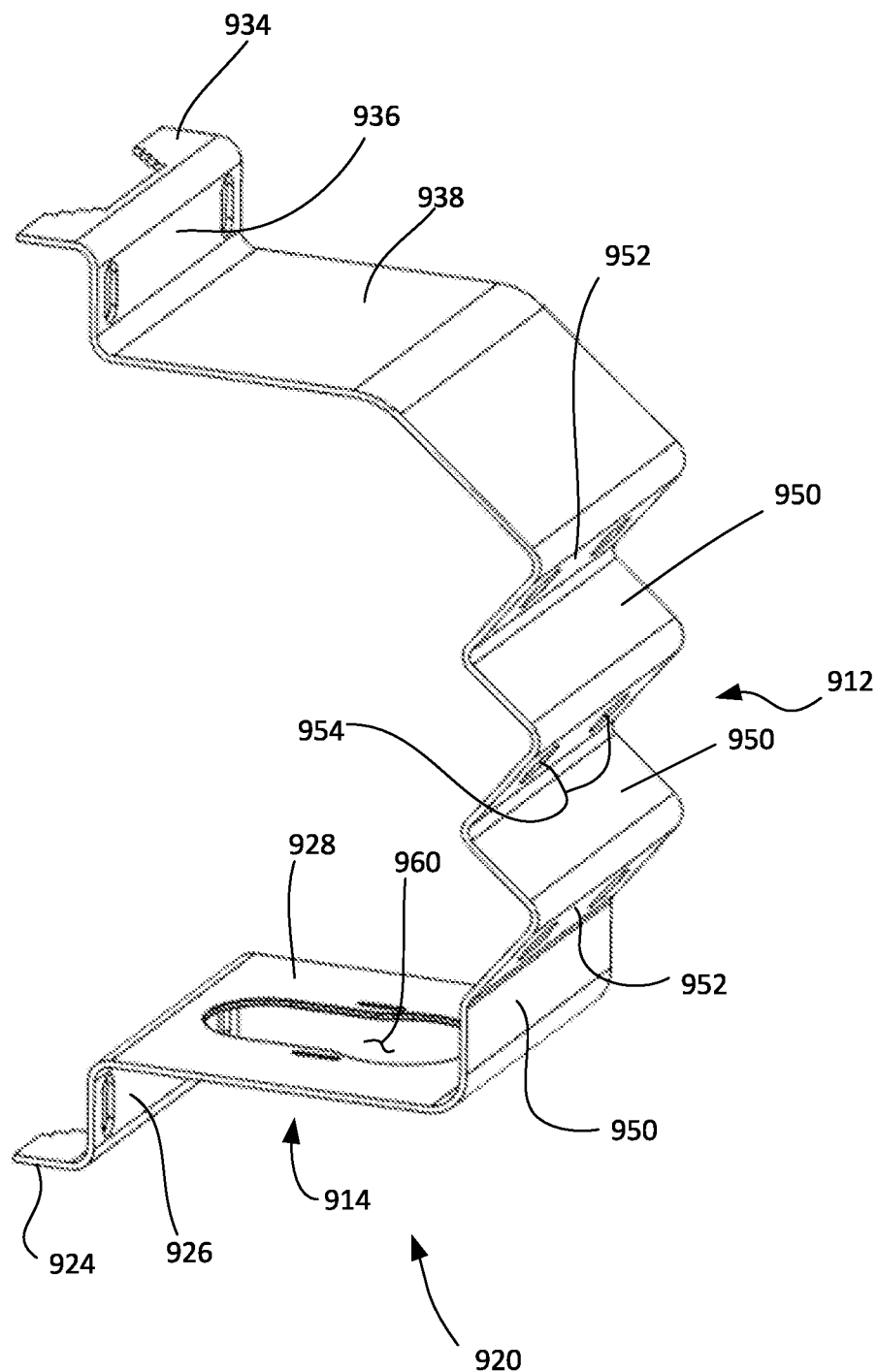
FIG. 17 is a perspective of a bracket part of the mounting bracket of FIG. 16.

Referring to FIGS. 16 and 17, one exemplary embodiment of a mounting bracket within the scope of this disclosure is generally indicated at 910. The mounting bracket 910 comprises a pigtail connector holder, generally indicated at 912, configured to hold a plurality of pigtail connectors 122 coupled to the pigtail cables (not illustrated in FIGS. 16 and 17) of a fiber optic fan-out system 140 at spaced apart locations. The mounting bracket 910 further comprises a fan-out housing holder, generally indicated at 914, configured to hold a fan-out housing 134 of the fiber optic fan-out system 140. A fastening system, generally indicated at 916, is configured to affix the mounting bracket 910 onto a pole P.

The illustrated mounting bracket 910 comprises a holder part 920 formed from a single monolithic piece of material. The holder part 920 includes the pigtail connector holder 912 and the fan-out housing holder 914. In an exemplary embodiment, the holder part 920 is formed from a sheet or strip of metal or other thin bendable or formable material. The holder part 920 has opposite first and second end portions that are shown engaged with the pole P in FIG. 16. The holder part 920 also has opposite first and second longitudinal edge margins that extend from the first end portion to the second end portion. The holder part 920 has a plurality of bends that extend along parallel bend lines extending from the first longitudinal edge margin to the second longitudinal edge margin at spaced apart locations between the first end portion and the second end portion. The bends define discrete facets or walls of the mounting bracket 910 that mount different pigtail (or other) connectors. It will be understood that a mounting bracket may be made of separate pieces that are joined together within the scope of the present invention.

Referring to FIG. 17, in the illustrated embodiment, a bottom bend connects a lower pole grip 924 that defines the first end portion of the holder part 920 to a lower flange 926. A lower inboard bend connects the lower flange 926 to a lower end wall 928, which forms the fan-out housing holder 914. A lower outboard bend connects the lower end wall 928 to a lower end of a middle portion of the holder part 920, which forms the pigtail connector holder 912. Like the bottom bend, a top bend connects an upper pole grip 934 that defines the second end portion of the holder part 920 to an upper flange 936. An upper inboard bend connects the upper flange 936 to an upper end wall 938 oriented generally parallel to the lower end wall 928. An upper outboard bend connects the upper end wall 938 to an upper end of the middle portion of the holder part 920, which forms the pigtail connector holder 912.

Referring to FIG. 16, the illustrated fastening system 916 comprises a lower pole clamp 940 and an upper pole clamp 942. The lower and upper pole clamps 940, 942 are configured to couple to the lower and upper flanges 926, 936, respectively, to clamp the mounting bracket 910 onto a pole P as shown. As shown in FIG. 17, each of the pole grips 924, 934 has a concave recess formed along the respective end margin of the holder part 920. As shown in FIG. 16, each concave recess is suitably sized and arranged to receive the pole P such that the edges of the holder part 920 which define the recesses engage the pole. As shown in FIG. 17, the edges of the pole grips 924, 934 that define the pole-receiving recess may be formed to have a plurality of teeth that aid in gripping the pole P.

Referring to FIG. 17, along the middle portion of the holder bracket 920, the parallel bends define a plurality of alternating riser facets 950 and offset pigtail connection facets 952. Each offset pigtail connection facet 952 extends in a different plane and defines at least one hole 954 for receiving one of (i) one of the pigtail connectors, (ii) an adapter for mating with one of the pigtail connectors, and (iii) an in-line connector for mating with one of the pigtail connectors. When a one of the optical connection elements (i)-(iii) is received in a hole 954 and an optical connection is made via said optical connection element, the bracket part 920 is configured to support the respective pigtail connector on the mounting bracket 910 at a spaced apart location from the other pigtail connectors. As can be seen, each of the illustrated pigtail connection facets 952 defines two holes 954 for holding two spaced apart connection elements (i)-(iii) in a row located between two adjacent riser facets 950. The riser facets allow sufficient space for the connectors to be held at the same angle by adjacent pigtail connection facets 952.

Referring to FIGS. 16 and 17, the fan-out housing holder 912 comprises a keyhole slot 960 that functions the same as the keyhole slot 830 described above. The illustrated bracket part 920 has an interior side facing generally toward the pole P and an exterior side facing generally away from the pole. The bracket 910 can receive the fan-out system 140 such that the fan-out housing 134 is held in the fan-out housing holder 914 and the pigtail cables (not shown) extend upward from the fan-out housing and then curve toward the respective connectors 122 held in place at the respective holes 954 of the pigtail connector holder 912. Thus, the pigtail cables of the fan-out system are located on the interior side of the bracket part 920. In the illustrated embodiment, the mounting bracket 910 holds the pigtail connectors 122 such that the pigtail connectors point downward and toward the exterior side of the bracket part 920. Thus, the pigtail connection facets 952 are configured so that cables (e.g., destination cables) connected to the pigtail connectors 122 of the fan-out system extend downward as they extend outward away from the mounting bracket 910 on the exterior side of the mounting bracket.

Figure 18:
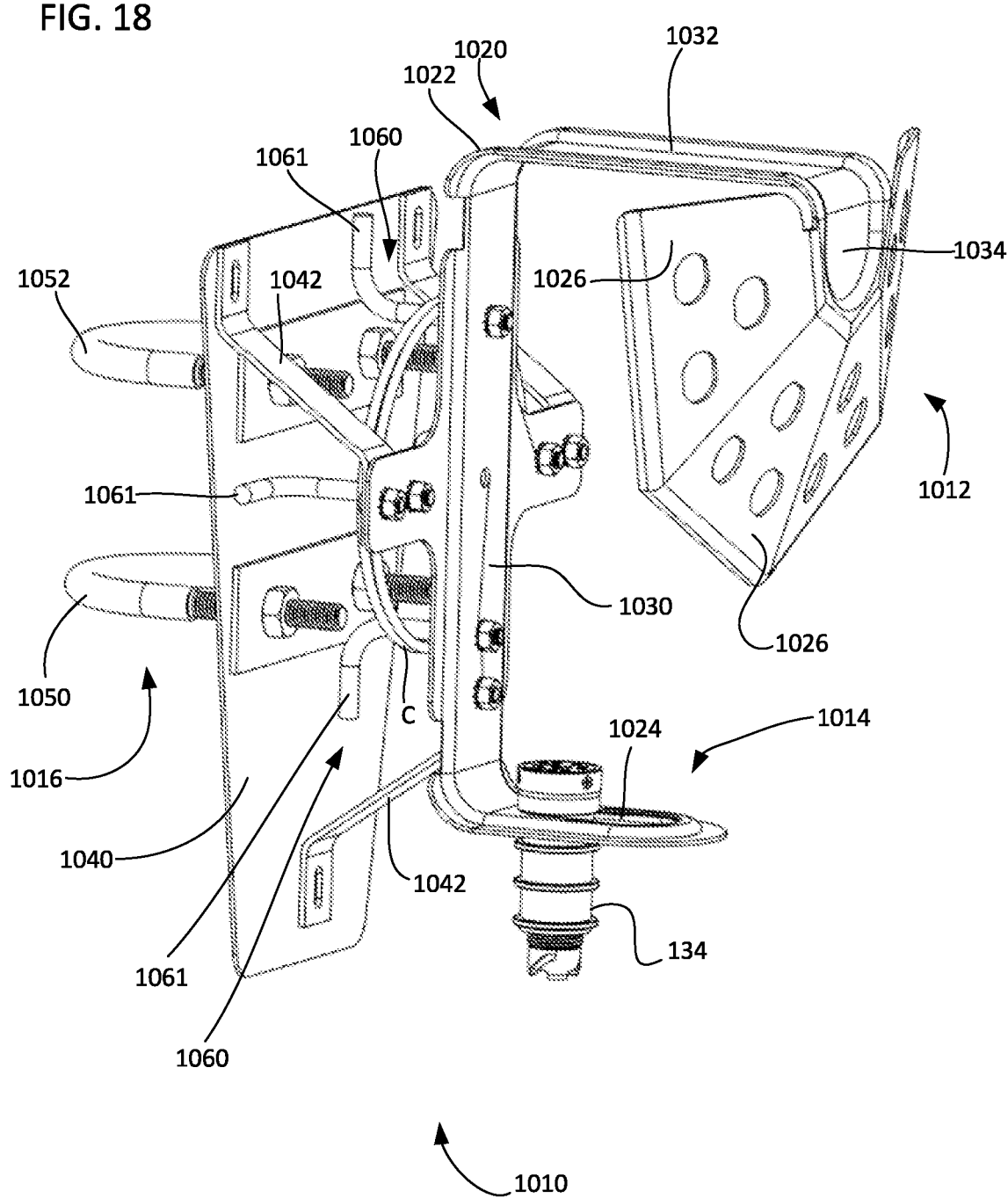
FIG. 18 is a perspective of another fan-out system mounting bracket.
Figure 19:
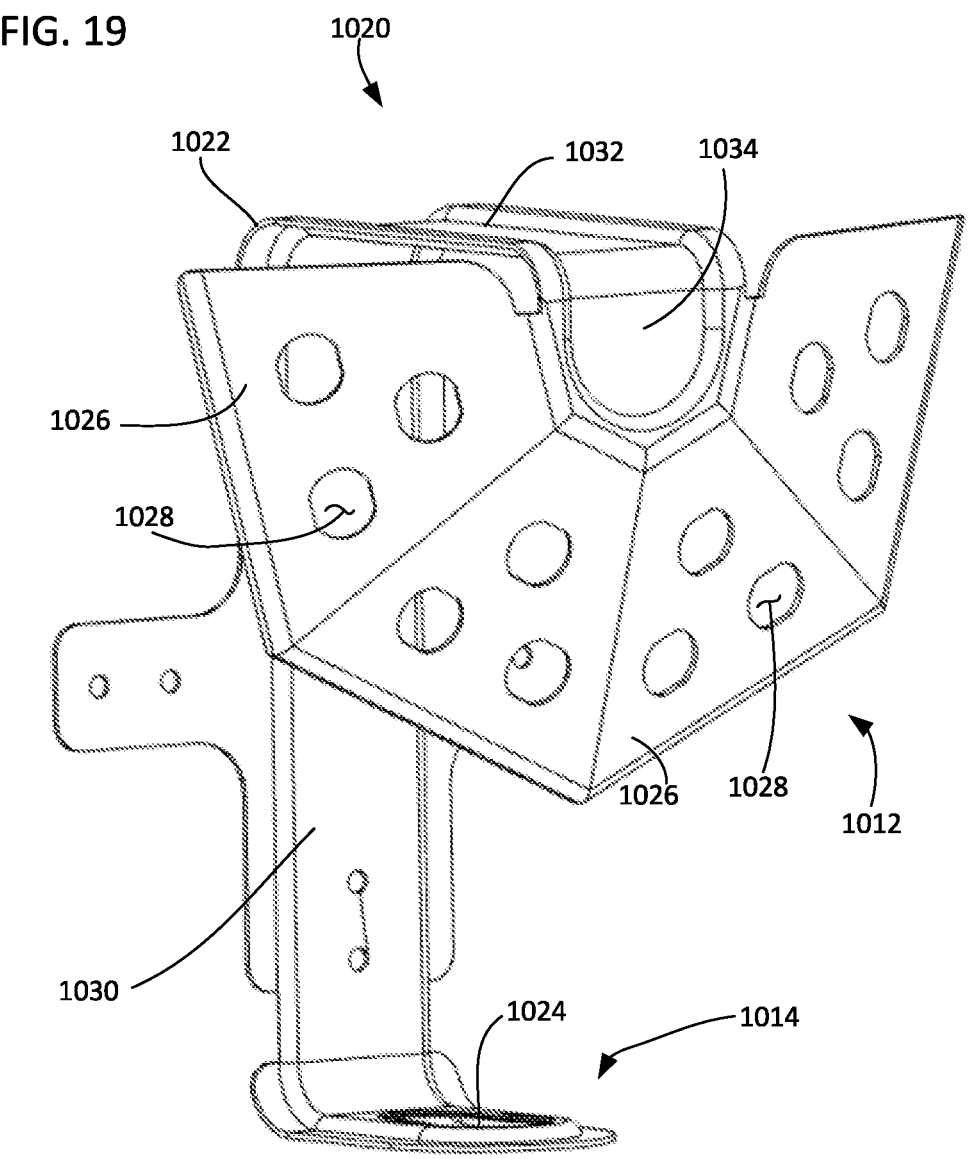
FIG. 19 is a perspective of a bracket part of the mounting bracket of FIG. 16.

Referring to FIGS. 18 and 19, another exemplary embodiment of a mounting bracket within the scope of this disclosure is generally indicated at 1010. The mounting bracket 1010 comprises a pigtail connector holder, generally indicated at 1012, configured to hold a plurality of pigtail connectors (not shown) coupled to the pigtail cables (not shown) of a fiber optic fan-out system at spaced apart locations. The mounting bracket 1010 further comprises a fan-out housing holder, generally indicated at 1014, configured to hold a fan-out housing 134 of the fiber optic fan-out system 140. A fastening system, generally indicated at 1016, is configured to affix the mounting bracket 1010 onto a pole (not shown).

The illustrated mounting bracket 1010 comprises a holder part 1020, shown separately in FIG. 19. The holder part 1020 includes the pigtail connector holder 1012, the fan-out housing holder 1014, and a support arm 1022 connecting the pigtail connector holder to the fan-out housing holder in spaced apart relation therewith. In one or more embodiments, the holder part 1020 is formed from a single monolithic piece of material; however more than one piece of material can be used for the holder part without departing from the scope of the disclosure.

In the illustrated embodiment, the fan-out housing holder 1014 comprises a keyhole slot 1024 that functions the same as the keyhole slot 830 described above. The illustrated pigtail connector 1012 holder comprises a multi-faceted plate comprising a plurality of plate portions 1026 extending in transverse planes. Each plate portion 1026 defines a plurality of holes 1028 (broadly, at least one hole) for receiving one of (i) one of the pigtail connectors, (ii) an adapter for mating with one of the pigtail connectors, and (iii) an in-line connector for mating with one of the pigtail connectors. When a one of the optical connection elements (i)-(iii) is received in a hole 1028 and an optical connection is made via said optical connection element, the bracket part 1020 is configured to support the respective pigtail connector on the mounting bracket 1010 at a spaced apart location from the other pigtail connectors. In the illustrated embodiment, each of the plate portions 1026 has a generally vertical orientation when the mounting bracket 1010 is secured to the pole.

In the illustrated embodiment, the support arm 1022 has an inverted J-shaped configuration including an upright segment 1030 (broadly, a first segment) that extends from the fan-out housing holder in an upward direction (broadly, a first direction), a projecting segment 1032 (broadly, a second segment) extending from the upper end of the upright segment in a forward direction (broadly, a second direction transverse to the first direction), and a downturned segment 1034 (broadly, a third segment) extending from the front end portion of the projecting segment in a downward direction (broadly, a third direction generally opposite the first direction). The pigtail connector holder 1012 is affixed to the downturned segment 1034 of the support arm 1022 so that the plate portions 1026 extend generally vertically.

Referring to FIG. 18, the illustrated mounting bracket 1010 further comprises a back plate 1040 and at least one strut 1042 connecting the support arm 1022 to the back plate such that support arm is spaced apart from the back plate in the forward direction (broadly, in a direction perpendicular to the back plate). The illustrated fastening system 1016 comprises a lower pole clamp 1050 and an upper pole clamp 1052. The lower and upper pole clamps 1050, 1052 are configured to couple to the back plate 1040 to clamp the mounting bracket 910 onto a pole.

The illustrated mounting bracket 1010 further comprises a cable hanger 1060 configured such that cabling C of the fiber optic fan-out system can be looped around the cable hanger whereby the cable hanger supports the looped cabling on the mounting bracket. The illustrated cable hanger 1060 comprises a plurality of L-shaped rods 1061 that are secured to the support arm 1022 at spaced apart locations about a center axis of the cable hanger. A first segment of each L-shaped rod 1061 extends rearward from the support arm 1022 along the center axis of the hanger 1060 and a free end segment of each L-shaped rod extends radially outward. As can be seen, the cable C can be wound onto the rearward extending segments of the L-shaped rods and the radially outward extending segments that define the free ends of the rods prevent the wound cable from sliding off of the cable hanger 1060. Although the illustrated cable hanger 1060 is formed on the rear side of the support arm 1022, it is also contemplated that a cable hanger can be formed on the back plate to extend forward from the back plate toward the support arm in another embodiment.

The bracket 1010 can receive the fan-out system 140 such that the fan-out housing 134 is held in the fan-out housing holder 1014 and the pigtail cables (not shown) extend upward from the fan-out housing and then curve forward toward the respective connectors (not shown) held in place at the respective holes 1028 of the pigtail connector holder 1012. In the illustrated embodiment, the bracket 1010 is configured to hold the pigtail connectors such that the pigtail connectors point generally forward. The connectors supported on different plate portions 1026 will point in slightly different, generally forwardly oriented directions. Thus, the bracket 1010 is generally configured so that the cables (e.g., destination cables) connected to the pigtail connectors 122 of the fan-out system 140 extend outward away from the pigtail connector holder 1012.

As can be seen, the illustrated mounting brackets 810, 910, 1010 are configured to hold the fan-out system 140 in open air on a pole. The mounting brackets 810, 910, 1010 do not enclose the fan-out system 140 in an environmentally sealed chamber and instead rely on the environmental protections integral to the fan-out system itself. This allows the mounting brackets 810, 910, 1010 to be manufactured inexpensively while still providing a very robust solution for supporting a fan-out system for plug-and-play use on a support structure such as a pole.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A mounting bracket for supporting a fiber optic fan-out system including a fan-out housing and a cable attached to the fan-out housing, the mounting bracket comprising:
a pigtail connector holder configured to hold a plurality of pigtail connectors of the fiber optic fan-out system at spaced apart locations along the pigtail connector holder, the pigtail connector holder including plate portions and holes in the plate portions sized and shaped for receiving and holding the pigtail connectors;
a fan-out housing holder configured to hold the fan-out housing of the fiber optic fan-out system;
the pigtail connector holder and fan-out housing holder being configured for mounting on a support structure for suspending the fan-out system in placed relative to the support structure
the mounting bracket further comprising a mount for mounting at least one of the pigtail connector holder and the fan-out housing holder on the support structure, wherein the mount comprises a first strap configured for mounting the pigtail connector holder on the support structure, and a second strap for mounting the fan-out housing holder on the support structure.

2. A mounting bracket for supporting a fiber optic fan-out system including a fan-out housing and a cable attached to the fan-out housing, the mounting bracket comprising:
a pigtail connector holder configured to hold a plurality of pigtail connectors of the fiber optic fan-out system at spaced apart locations along the pigtail connector holder, the pigtail connector holder including plate portions and holes in the plate portions sized and shaped for receiving and holding the pigtail connectors;
a fan-out housing holder configured to hold the fan-out housing of the fiber optic fan-out system;
the pigtail connector holder and fan-out housing holder being configured for mounting on a support structure for suspending the fan-out system in placed relative to the support structure
the mounting bracket further comprising a mount for mounting at least one of the pigtail connector holder and the fan-out housing holder on the support structure, wherein the mount comprises a clamp, and wherein the mount further comprises a back plate connected to the pigtail connector holder and the fan-out housing holder, the clamp being adapted to attach the back plate to the support structure.

3. The mounting bracket as set forth in claim 2 wherein the clamp comprises a first clamp, the mount further comprising a second clamp.

4. The mounting bracket as set forth in claim 2 wherein the plate portions include opposite first and second surfaces, each hole passing through both the first and second surfaces, the first and second surfaces each being open to the ambient environment.

5. A mounting bracket for supporting a fiber optic fan-out system including a fan-out housing and a cable attached to the fan-out housing, the mounting bracket comprising:
a pigtail connector holder configured to hold a plurality of pigtail connectors of the fiber optic fan-out system at spaced apart locations along the pigtail connector holder, the pigtail connector holder including plate portions and holes in the plate portions sized and shaped for receiving and holding the pigtail connectors;
a fan-out housing holder configured to hold the fan-out housing of the fiber optic fan-out system;
the pigtail connector holder and fan-out housing holder being configured for mounting on a support structure for suspending the fan-out system in placed relative to the support structure;
wherein the fan-out holder defines a keyhole slot that extends generally in plane, the keyhole slot having a longitudinal axis located on the plane and having a first portion and a second portion spaced apart along the longitudinal axis, the first portion having a first maximum inner dimension along a transverse axis located on the plane and oriented transverse to the longitudinal axis, the second portion having a second maximum inner dimension along the transverse axis, the first inner dimension being greater than the second inner dimension such that an enlarged portion of the fan-out housing is passable through the first portion of the keyhole slot by movement of the fan-out housing relative to the fan-out housing holder along an insertion axis transverse to the plane of the keyhole slot, the fan-out housing being slidable along the longitudinal axis from the first portion of the keyhole slot to the second portion of the keyhole slot after the enlarged portion passes through the first portion of the key hole slot along the insertion axis, wherein the fan-out housing holder is sized and arranged to seat the enlarged portion of the fan-out housing and thereby hold the fan-out housing on the mounting bracket when the fan-out housing slides along the longitudinal axis to the second portion of the keyhole slot.

6. A mounting bracket for supporting a fiber optic fan-out system including a fan-out housing and a cable attached to the fan-out housing, the mounting bracket comprising:
a pigtail connector holder configured to hold a plurality of pigtail connectors of the fiber optic fan-out system at spaced apart locations along the pigtail connector holder;
a fan-out housing holder configured to hold the fan-out housing of the fiber optic fan-out system;
a back plate operatively connected to the pigtail connector holder and to the fan-out housing holder;

an excess cable holder operatively connected to the pigtail connector holder, the fan-out housing holder and the back plate and configured to hold excess of the cable of the fan-out system.

7. The mounting bracket as set forth in claim 6 wherein the excess cable holder is located between the pigtail connector holder and the back plate.

8. The mounting bracket as set forth in claim 7 wherein the excess cable holder is located between the fan-out housing holder.

9. The mounting bracket as set forth in claim 8 wherein the excess cable holder spaces the pigtail connector holder and the fan-out housing holder from the back plate.

10. The mounting bracket as set forth in claim 9 wherein the excess cable holder comprises a rod connected to the back plate and operatively connected to at least one of the pigtail connector holder and the fan-out housing holder and defines a space for receiving the excess cable wrapped around the rod.

11. The mounting bracket as set forth in claim 10 wherein the rod comprises a first rod, the excess cable holder further comprising a second rod, a third rod and a fourth rod, the first, second, third and fourth rods being arranged for wrapping the excess cable around the first, second, third and fourth rods in a loop, and wherein at least one of the pigtail connector holder and fan-out housing holders is positioned for retaining the excess cable wrapped around the first, second, third and fourth rods on the rods.

12. The mounting bracket as set forth in claim 6 wherein the fan-out housing holder comprises a keyhole slot that extends generally in plane, the keyhole slot having a longitudinal axis located on the plane and having a first portion and a second portion spaced apart along the longitudinal axis, the first portion having a first maximum inner dimension along a transverse axis located on the plane and oriented transverse to the longitudinal axis, the second portion having a second maximum inner dimension along the transverse axis, the first inner dimension being greater than the second inner dimension such that an enlarged portion of the fan-out housing is passable through the first portion of the keyhole slot by movement of the fan-out housing relative to the fan-out housing holder along an insertion axis transverse to the plane of the keyhole slot, the fan-out housing being slidable along the longitudinal axis from the first portion of the keyhole slot to the second portion of the keyhole slot after the enlarged portion passes through the first portion of the key hole slot along the insertion axis, wherein the fan-out housing holder is sized and arranged to seat the enlarged portion of the fan-out housing and thereby hold the fan-out housing on the mounting bracket when the fan-out housing slides along the longitudinal axis to the second portion of the keyhole slot.

13. A mounting bracket for supporting a fiber optic fan-out system including a fan-out housing and a cable attached to the fan-out housing, the mounting bracket comprising:

a fan-out housing holder configured to hold the fan-out housing of the fiber optic fan-out system;

a pigtail connector holder configured to hold a plurality of pigtail connectors of the fiber optic fan-out system at spaced apart locations along the pigtail connector holder, the pigtail connector holder including a plurality of plate portions, the plate portions defining holes sized and shaped for receiving one of (i) one of the pigtail connectors, (ii) an adapter for mating with one of the pigtail connectors, and (iii) an in-line connector for mating with one of the pigtail connectors;

wherein the fan-out housing holder comprises a keyhole slot that extends generally in plane, the keyhole slot having a longitudinal axis located on the plane and having a first portion and a second portion spaced apart along the longitudinal axis, the first portion having a first maximum inner dimension along a transverse axis located on the plane and oriented transverse to the longitudinal axis, the second portion having a second maximum inner dimension along the transverse axis, the first inner dimension being greater than the second inner dimension such that an enlarged portion of the fan-out housing is passable through the first portion of the keyhole slot by movement of the fan-out housing relative to the fan-out housing holder along an insertion axis transverse to the plane of the keyhole slot, the fan-out housing being slidable along the longitudinal axis from the first portion of the keyhole slot to the second portion of the keyhole slot after the enlarged portion passes through the first portion of the key hole slot along the insertion axis, wherein the fan-out housing holder is sized and arranged to seat the enlarged portion of the fan-out housing and thereby hold the fan-out housing on the mounting bracket when the fan-out housing slides along the longitudinal axis to the second portion of the keyhole slot.

14. The mounting bracket as set forth in claim 13 wherein at least some of the plate portions include a plurality of the holes.

15. The mounting bracket as set forth in claim 13 wherein the plate portions are formed in a single piece of material, and at least some of the plate portions are not coplanar.

* * * * *